United States Patent
Papanikolaou et al.

(10) Patent No.: US 6,941,307 B2
(45) Date of Patent: Sep. 6, 2005

(54) ARRANGEMENT AND A METHOD RELATING TO SESSION MANAGEMENT IN A PORTAL STRUCTURE

(75) Inventors: Thomas Papanikolaou, Aachen (DE); Jan Akerfeldt, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 4 days.

(21) Appl. No.: 10/466,664

(22) PCT Filed: Jan. 24, 2002

(86) PCT No.: PCT/SE02/00113

§ 371 (c)(1),
(2), (4) Date: Jul. 18, 2003

(87) PCT Pub. No.: WO02/059787

PCT Pub. Date: Aug. 1, 2002

(65) Prior Publication Data

US 2004/0049589 A1 Mar. 11, 2004

(30) Foreign Application Priority Data

Jan. 24, 2001 (SE) .............................................. 0100187

(51) Int. Cl.$^7$ .............................................. G06F 17/30
(52) U.S. Cl. ..................................... 707/10; 707/104.1
(58) Field of Search ........................... 707/9, 10, 104.1; 370/384, 404; 455/414.1, 418, 466; 705/1, 14, 39, 80; 709/203, 219, 229, 246; 713/201; 717/103

(56) References Cited

U.S. PATENT DOCUMENTS

| | | | | |
|---|---|---|---|---|
| 6,640,097 B2 | * | 10/2003 | Corrigan et al. | 370/404 |
| 2001/0047387 A1 | * | 11/2001 | Brockhurst | 709/203 |
| 2002/0187775 A1 | * | 12/2002 | Corrigan et al. | 455/414 |
| 2003/0139174 A1 | * | 7/2003 | Rao | 455/418 |

\* cited by examiner

*Primary Examiner*—Apu Mofiz (57) ABSTRACT

The present invention relates to a portal structure providing end user stations (5) with access to services/applications (26), comprising a portal core (1) and a number of services/applications (26). The portal core comprises a presentation arrangement, portal session managing means (13) generating session related information, e.g. session identifications and portal storing means (51) for storing session related information. At least some of the services/applications (26) are external with external session identifications. Session unifying means (50) are provided for mapping between portal session identifications and external session identifications. For communication between the portal core (1) and external services/applications (26), the external identification is used, whereas, in communication between an end user station (5) and the portal core (1), only the portal session identification is used.

20 Claims, 8 Drawing Sheets

ARRANGEMENT AND A METHOD RELATING TO SESSION MANAGEMENT IN A PORTAL STRUCTURE

This application is related to U.S. patent application Ser. No. 10/466,605, filed on Jul. 18, 2003; U.S. patent application Ser. No. 10/470,224 filed on Jul. 24, 2003; and U.S. patent application Ser. No. 10/470,221 filed on Jul. 24, 2003, the disclosures of which are fully incorporated herein by reference.

TECHNICAL FIELD

The present invention relates to session management and portal structures, particularly Internet portals, providing end user stations with access to services/applications. The invention also relates to an arrangement in a portal structure used for session management. The invention further relates to a method of session management in a portal structure for end users accessing services/applications via said portal structure.

The invention particularly relates to handling of session management when different entities, such as portals, services or application are managed by different session management means.

BACKGROUND OF THE INVENTION

When referring to a portal is generally meant an Internet portal. Internet portals interacting with end users usually provide for session management in order to be able to track and keep control of the activities of the end users, and in order to store end user specific information, like authentication status, information, such as lists and order of initiated actions and resulting events etc. Today a portal often needs to be able to integrate functionality of other software systems or even other portals. However, sometimes such other systems, such as services/applications or other portals, have their own session management. This means that in one way or another session management as provided for by different session managing means needs to be integrated or combined.

There is also an increasing need to personalize or customize the way an end user can access services irrespectively of the actual location of the services or applications, or who is the provider. Also the demand for access to mobile Internet services gains importance, i. e. that end users may want to be able to, in a rapid and uncomplicated manner, get access to services from any end user station, i. e. also from mobile devices; it may e. g. relate to sending and receiving e-mails, short messages, accessing web-based information from mobile as well as from fixed end user devices in a user-friendly, quick and simple manner. This is called the mobile Internet.

Browsing using a mobile device is however more difficult than browsing using a PC, since the mobile device, as compared to the PC, has limited input and output capabilities. Thus, this means that it gets even more difficult to provide mobile end users with a satisfactory personalization, and management of services as well as session management get even more complicated. Anyhow, there is an increasing demand on behalf of the end user to always be able to access applications and services. A portal is such a doorway to the content of services and applications which particularly should be tailored to suit the end user preferences.

Examples on portal content are information services (also including push content which relates to an Internet technique through which all information a user subscribes to automatically is provided to the user, or information that the service provider or operator means that the user should be provided with). Examples on information services are weather forecasts or weather information in general, commercial services such as shopping malls, or generally any kind of information, multimedia services such as streaming audio/video, games, instant messaging and newsgroups, web based mall, access to particular communities through chat-rooms. It is also desirable to be able to provide appealing graphical user interfaces for representing applications and menus on PC: s, and particularly also for WAP enabled devices, in case a portal is mobile. Much effort is also put down on personalizing the structure and the content of personal portals, and to provide a possibility to control the interaction and behaviour of individual services and applications, by setting personal preferences. It is however difficult to provide for satisfactory access possibilities irrespectively of which kind of device that is used by an end user. Particularly when different systems need to be integrated, as far as session management issues are concerned, i. e. when the different systems (portals, services/applications, other portals etc.) have their own session management, the situation may get very complicated.

Until now many applications are in principle exclusively designed for the 2G telecommunications environment and they have been implemented as monolithical blocks or with a proprietary service network to handle the specific QoS requirements for the respective applications. This has a consequence that such applications work satisfactory as isolated applications, but they are difficult to integrate with other applications developed in similar ways. Applications developed for the Internet (Internet protocol) environment have to a large extent been based on established and open de facto standards supporting extensive integration of different applications. Many such standards have been used in the 2G environment for non realtime critical applications. However, through the introduction of 3G networks (3GPP), future applications will contain a mixture of telecommunication and datacommunication services, mixing higher and lower bit rates as well as real time and non-real time traffic. The service networks of today are not designed to handle such mixtures, nor are the existing IP-based applications designed for the specific characteristics concerning wireless networks. As can be seen there are many complicating factors concerning the provision of satisfactory access for end users to services, particularly when session management is handled by different session managers for different systems/entities.

Session management of homogeneous portal environments can be clearly specified and may for example be performed based on the servlet session API (Application Programming Interface) specification or the session EJB (Enterprise Java Beans) specification. These specifications define the basic operations for session management, namely to create/destruct a session and to get, set and remove a key-value pair in a constructed session.

Internet portals are usually provided with a session management system allowing tracking of the actions initiated by an end user. Such actions may for example include the actions end user entering the system, authentication of the end user, access by the end user to a portal service etc. As long as the end user navigates within the portal, i. e. requests access to services/applications internal to the portal, which here means services/applications for which session management is handled centrally within the portal, session management can be handled easily, since every portal service can ask a central session manager, i. e. the portal session managing means, to retrieve information stored in the session of the end user. The sessions are particularly stored in storing means. However, the situation is different if an end user requests access to an external system or to a service or an application integrated with the portal, or an external service/application, which here means a service/application having an external, or its own specific session management. The situation can then be very complicated. A serious problem is that, if a service or an application (or another portal), that an end user wants to access via a portal structure, has its own session management, the external session management may be incompatible to the portal session management. This is often the case when application service providers offer services to portal owners. For various reasons it may not be desirable to expose the external session management to the end user. Still further the sessions created taking into account also the external session management tend to get very long, i. e. the session identity that is used in communication with the end user has to contain not only the portal session identity, but in addition thereto also the external session identity. Often such lengthy session identifications can not be handled by the clients served by the portal. This is particularly serious if the end user station is a mobile device such as a WAP-device, which simply might not be able to handle such large amounts of data. Even for an end user station able to handle such amounts of data only for identification purposes, it involves a waste of resources and time.

SUMMARY OF THE INVENTION

What is needed is therefore a portal structure through which session management can be handled in an easy and efficient manner, also when the session management of the accessed systems/services/applications is handled by other, different session managing systems. Particularly, when a portal structure has its own portal session managing means and another system, such as a service, an application or another portal, to which an end user requests access, has its own, here denoted external, or proprietary, session managing means, an easy and efficient session management is needed. Particularly a seamless unification of session management between portals and externally session-managed (external) systems is needed. A portal structure is also needed through which the session management existing in other systems, such as services/applications or portals that are session-managed by third party session managing means, or external session managing means, can be combined and integrated with the portal session management.

An arrangement is also needed through which a portal (internal) session management and various session management methods of third party or external session managed systems can be unified into a unified session management. Particularly a portal structure is needed which is able to provide an end user with access to services/applications for which session management is handled by external session managing means (third party session managing means), i. e. not the same session managing means as the portal session managing means as well as to internal services/applications. An end user should thus be provided with access to services etc. irrespectively of whether the services/applications (content) are located within the portal structure itself, or whether the applications/services and the content thereof reside outside the portal, i. e. are provided by external providers and/or are session-managed by external session managing means.

Particularly a portal structure is needed which allows access by mobile end user stations (in addition to fixed end user stations) irrespectively of whether accessed services/applications etc. are internally or externally session-managed. A portal structure is also needed through which the number of parameters that have to be used in communication with end users is reduced as compared to for hitherto known structures, and irrespectively of whether accessed services/applications reside within the portal or not, and irrespectively of whether they are separately or externally session-managed. Particularly a portal structure is needed which is capable of integrating different session management methods at the same time as it integrates Internet and WAP-based services, so that access is enabled from any Internet connected PC, WAP-device or any other mobile device using any mobile access network.

An arrangement for handling and integrating session management in a portal structure is also needed through which one or more of the above mentioned objects can be fulfilled. Still further a method for handling session management in a portal structure is needed, as well as a method of providing an end user with access to services/applications, irrespectively of whether they are session-managed by the portal session managing means or by external session managing means, through which one or more of the above mentioned objects can be fulfilled.

By using a generic markup language in a portal, content of applications and services can be stored independently of user station or user device, and before showing the content of an application or a service, the content can be transformed into the format, i. e. the markup language, that can be understood by the end user device. One example on such a generic markup language is the XML (Extended Markup Language). As a standard for navigation in an XML-based portal is the XLink specification used, which allows elements to be inserted into XML documents in order to create and describe links between resources. XLink provides a framework for creating both basic unidirectional links and more complex linking structures. It allows XML documents to assert linking relationships among more than two resources, associate metadata with a link and to express links residing in a location separate from the linked resources. XML is described in W3C Recommendation, 6 Oct. 2000, Extensible Markup Language (XML) 1.0 (Second Edition), which herewith is incorporated herein by reference.

In the following some concepts used in this document will be described or defined. A portal is generally a non-physical entity in the Internet domain which can be described as an "electronic publishing space" which is owned by an individual or an organization, and which provides either direct access to information and services, or links to other entities in the Internet or private intranet domains, providing information and services to authorized end users. A portal is in its simplest form a regular home page or a list of links, whereas in more advanced forms it may offer interactive services, not only to those who consume what is published, but also to those who are granted the right by the editor to publish on the portal, as well as to the editor himself, regarding different aspects on how the portal is used.

Wireless end users are given access through a "service" portal. Such a "service" portal is different from a traditional fixed Internet portal for PCs, and end users demand personalized services delivered to, and presented on, their mobile terminal at least as an option. In the following will however not the terminology "service" portal be used, but a portal (structure) in this document means either a conventional portal or a "service" portal.

An application is one or several cooperating software entities, the functional focus being user interaction and usefulness for the end user. An application platform is a defined combination of software and hardware entities used to implement applications of a certain kind which are characterized by the functionality and quality of its constituent parts.

By portal infrastructure is, in general terms, meant the software and hardware entities needed to either host or produce or generate a specific portal. Specifically it contains a portal core, an IP infrastructure and service enablers.

A service enabling means, also called a service enabler is a support functionality accessed via APIs (Application Programming Interface) raising the abstraction level and simplifying the application developer's task. A portal core is the core of a portal infrastructure, i. e. a portal core is the central part of a portal structure that is needed to develop a portal framework within which content and applications can be disclosed and accessed by end users in a controlled and unified manner. By a service network is generally meant an IP-based network, which consists of nodes hosting application servers, service capability servers, application support servers, IP infrastructure servers etc. Application support servers interface with service network resources or other external resources than core networks, whereas service capability servers interface with resources and functionality in core networks.

In the present application a portal structure is intended to mean a portal core, a plurality of services and applications with their content and service enabling means (service enablers). Generally may also the connectivity and data bearer functionality be included. However, important for the functioning of the present invention are the components of the portal core. The problems to be solved are particularly present when accessed services/applications are session-managed by other means than the session managing means of the portal structure itself.

Therefore the invention provides a portal structure, providing end user stations with access to services/applications which comprises a portal core (and service enabling means, connectivity means via which end user access is provided). The portal core comprises a presentation arrangement, a portal session managing means generating and handling session related information, e. g. session identifications, and storing means for storing session related information. The portal core also includes subscriber managing means, not further described. At least some of the services/applications comprise external services/applications which are session-managed by external session managing means generating and handling external application/service session related information, e. g. external session identifications.

The portal session managing means comprises a session unifying arrangement for mapping or transforming between portal session identifications and external service/application session identification information. For communication between the portal core and external services/applications, the external service/application external (proprietary) session identifications are used, whereas for communication between an end user station and the portal core, only the portal session identifications are used. Particularly the services/applications generate a generic markup language which, even more particularly, may be the XML language.

In advantageous implementation external session identification information for all external services/applications active in a session is stored in the portal storing means, at least throughout the duration of the respective session, or throughout a predefined time period. A time period may e. g. be defined such that when there has been no activity in the session for the given time period, the information need not be stored any longer.

In a particular implementation the portal structure is mobile, which here means that it supports access by mobile end user stations, such as for example WAP-devices, in addition to fixed end user stations. The portal structure includes rendering means for translating service/application data in a generic markup language into a different markup language as used by, or understandable to, an end user station. If a generic markup language is used, particularly XML, data of services/applications is defined in a Document Type Definition (DTD) language with an URL attribute (Uniform Resource Locator). DTD is (here) an XML-document describing all the elements and their attributes which are allowed in all the documents that can be seen as belonging to the particular DTD. In one implementation an external system (service/application) with its own, or external, session managing means, comprises another portal. In a particular implementation the portal session management operates according to the servlet session API or the session EJBs specifications for defining basic session management operations. This means that the specifications can be used to get a session from an externally session-managed system. In this specification it is also referred to as a backend system, which thus may be a service/application which is external, at least in the sense that it is externally session-managed. It may also be another portal with its own external, (proprietary) session managing means.

According to the invention the portal session managing means particularly stores information relating to end user initiated actions, such as end user entering the portal, end user authentication, end user access of a service/application etc. into the portal storing means.

According to the invention, when an end user station requests a service/application from the portal, a session with a portal session identification is created by the portal session managing means. The request is subsequently forwarded to the requested service/application which, if it is an internal service/application, uses the portal session identification. On the other hand, if the service/application is externally session managed, an external session identification is generated for the end user, which is used in communication between the portal and the service/application. For an externally session-managed service/application, the external session managing means stores the external session identification information generated for a requesting end user for a defined time period, e. g. throughout the session, or until the session has been "inactive" for a given time period.

When a subsequent call request is received from the portal, i. e. a subsequent call by the same end user in the same session for the same service/application, the generated external session identification is used to find the session in the service/application. Application data is generated and application information data is sent to the portal using the external session identification which, by the portal session unifying means, is converted into/mapped onto the portal session identification.

In one implementation a namespace is created within the portal session, and for each accessed external service/application session, information data is stored within the namespace. In a particularly advantageous embodiment an external service/application, or an external session managing means, creates an external (or proprietary) session with a service/application (proprietary) external session identification for an end user requesting access to the external service/application via the portal and introduces a metainformation tag, containing at least the proprietary or external session identification, into the data in the generic markup language, which is to be sent to the portal core. Particularly all data of the metainformation tag is stored in the corresponding portal session for the requesting end user.

In a particular implementation continuous navigation is provided to end user stations, irrespectively of where the service/application content is located, i. e. whether it is internal or external, through the introduction of metalinks to service/application data in a generic markup language, e. g. XML, to which the portal session id is added as a parameter. For this purpose the portal core comprises (first) translating means for processing such metalinks included in the service/application data. The portal core further comprises rendering means with (second) translating means for transforming the data in the generic markup language into a markup language understood by the requesting end user station, which is mobile or fixed. Continuous navigation as referred to above relates to a particularly advantageous implementation which, with advantage, may be combined with the unified session management as described in the present invention. The provision of continuous navigation by means of introduction of metalinks to the service/application data by the services/applications is described in the copending Swedish application "An arrangement and a method relating to access of applications/services" by the same applicant and filed on the same day as the present invention, and the content of which herewith is incorporated herein by reference.

Thus, in a most advantageous embodiment the portal structure is mobile, and it supports access by mobile end user stations over a mobile communication network, such as for example GSM (Global System for Mobile communications), WCDMA (Wideband Code Division Multiple Access), GPRS (GSM General Packet Radio Service), UMTS (Universal Mobile Telecommunications System), Bluetooth (which is a short range radio technology), WAP (Wireless Application Protocol) etc. Advantageously the portal structure supports access by broadband devices such as PCs, or more generally fixed devices, as well as mobile devices such as WAP-devices.

In other terms the portal structure supports access by fixed as well as mobile end users stations using different access formats or using different markup languages for communication with the portal structure.

According to one particular embodiment a service or an application may optionally be provided with one or more other metainformation tags in addition to metainformation tags containing external session identification information.

Although the invention is not limited thereto, if a generic markup language is used, the generic markup language may be XML. The XML-data and possible metalinks are defined in a Document Type Definition language (DTD). A metalink tag in XML-data comprises information about metalink type, a reference and addressing attribute (URL) containing service/application location information. The translating means (of the rendering means) translates XML-data by performing a transformation (XSL), i. e. the XML-data is processed together with a transformation stylesheet (XSL transformation) to produce an output format, i. e. a markup language, appropriate for the accessing end user station, e. g. HTML (Hypertext Markup Language) for a fixed end user station and WML (Wireless Markup Language) for a mobile end user station. XSL is described in XSL Transformations (XSLT) Version 1.0, which is a W3C Recommendation dated 10 Nov. 1999 and XSL Transformations (XSLT) Version 1.1., which is a W3C Working draft, 12 Dec. 2000, which documents herewith are incorporated herein by reference.

Particularly, at a subsequent access of the same service/application by the same end user in the same session, the stored metainformation containing the external (proprietary) session identification is forwarded from the portal session managing means by the session unifying means to the external service/application (external session managing means), such that the external session as indicated by the external session id can be found.

The invention also discloses an arrangement in a portal structure comprising a portal core with a presentation arrangement, portal session managing means generating and handling session related information, e. g. session identifications, and storing means for storing session related information. The arrangement further comprises a session unifying arrangement for unifying management of portal sessions and external sessions generated by external session managing means managing external services/applications. The portal session identification (only) is used in communication between the portal and an accessing end user station, and the external session identification information is used in communication between the portal and the external service/application. The unifying means comprises means for mapping between portal session identifications and external session identifications. Advantageously external service/application identification information is stored in the portal storing means in the respective portal session for a defined time period, e. g. throughout a session. The arrangement particularly comprises rendering means for translating service/application data in a generic markup language into other markup languages, depending on the type of a requesting end user station, for rendering a service/application data output to end user stations having requested access to a service/application. Particularly such generic markup language is XML.

In a preferred embodiment external session identification information is provided in metainformation tags introduced into the external service/application data, and more particularly the metainformation data is stored in the portal session in the portal storing means storing portal session information. The portal session identification is particularly added to the external application/service data as a parameter.

At a subsequent request to the portal for the same external service/application by an end user during an ongoing session, the metainformation is included into the request by the session unifying means upon forwarding the request to the external service/application, i. e. after mapping/transforming from portal to external session identification.

The invention also discloses a method of session management in a portal structure when external services/applications, which are externally session-managed, are accessed. The portal structure comprises a portal core with a presentation arrangement, portal session managing means handling session related information and portal storing means for storing session related information. The method includes the steps of; creating a portal session with a portal session identification when an end user requests access to a service/application, unless a portal session already exists; forwarding the request to the requested external service/application; creating, in or for the external service, by external session managing means, an external service/application session, whereby an external service/application session identification is generated unless the session already exists for the requesting end user; whereby, in the service/ application the following steps are performed; generating service/application data; introducing information about the external session identification to the service/application data; returning service/application data including the external session identification to the portal; whereby in the portal the following steps are performed: mapping the external session identification onto the portal session identification; storing the external session identification into the portal session in the portal storing means; sending the service/application data to the requesting end user using the portal session identification only.

The method further includes the steps of; looking up the portal session in the portal storing means at a subsequent request by the end user for the external service/application; establishing if the portal session related information contains an external session identification; if yes, forwarding the request including the external session identification to the requested external service/application; looking up the external proprietary service/application session in the service/application or in external session managing means, using the external session identification; generating service/application data; adding the external session identification to the service/application data; sending the service/application data with the external session identification to the portal session managing means etc. In a preferred implementation the external service/application generates a generic markup language, e. g. XML. Preferably the step of adding external session identification comprises generation of, and introduction of, a metainformation tag containing at least external session identification to the external service/application data.

The invention also discloses a method of integrating portal session management with the external session management of an externally session-managed system, which comprises the steps of; mapping between portal session identifications and external session identifications; storing information relating to external session identifications in portal storing means in a generated portal session; using the portal session identification in communication with an end user station; using information relating to the external session identification in communication with externally session-managed systems.

DETAILED DESCRIPTION OF THE DRAWINGS

The invention will in the following be further described in a non-limiting manner and with reference to the accompanying drawings, in which.

DETAILED DESCRIPTION OF THE INVENTION

Figure 1:
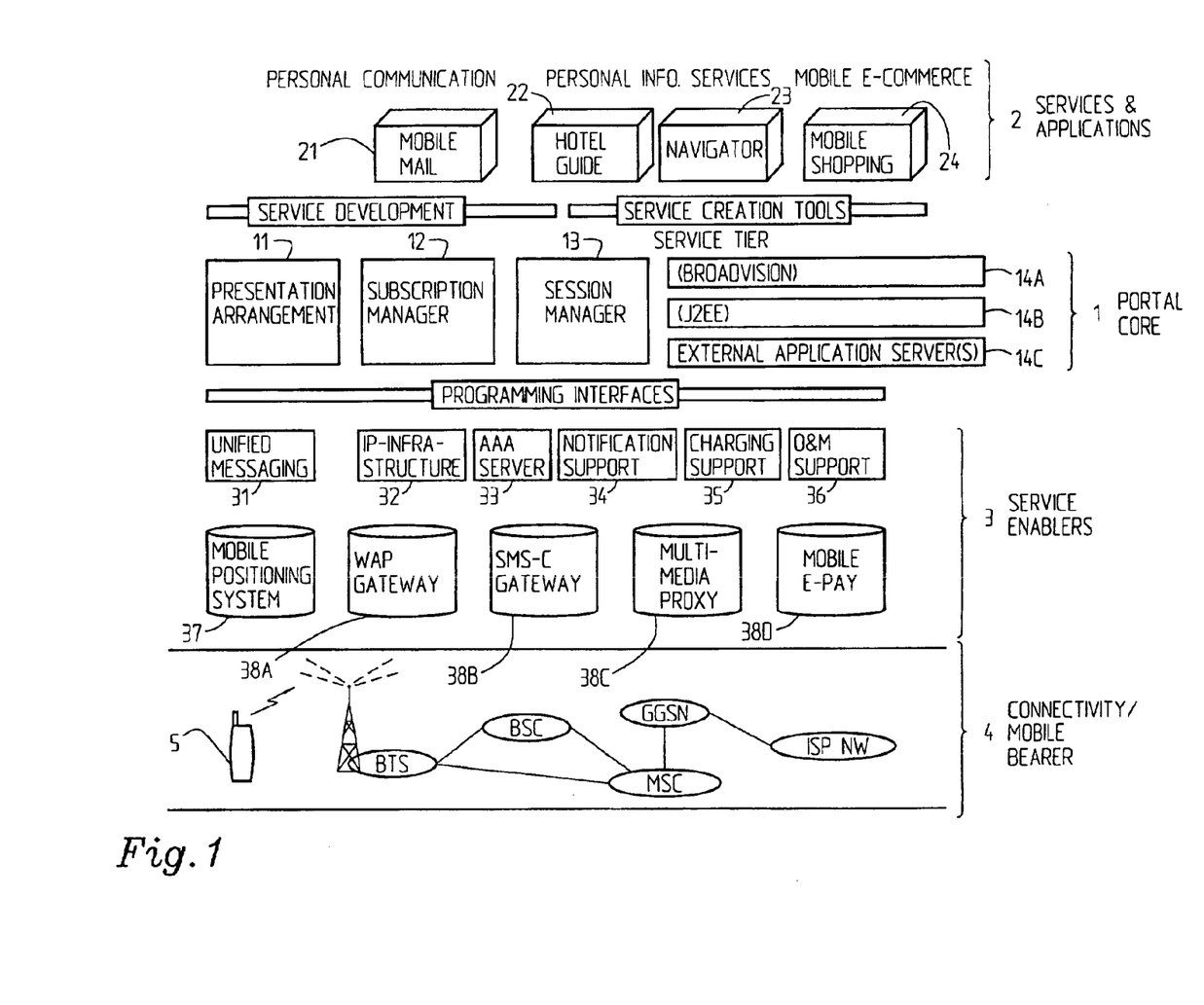
FIG. 1 schematically illustrates an overview of a portal structure according to one implementation of the invention.
Figure 2:
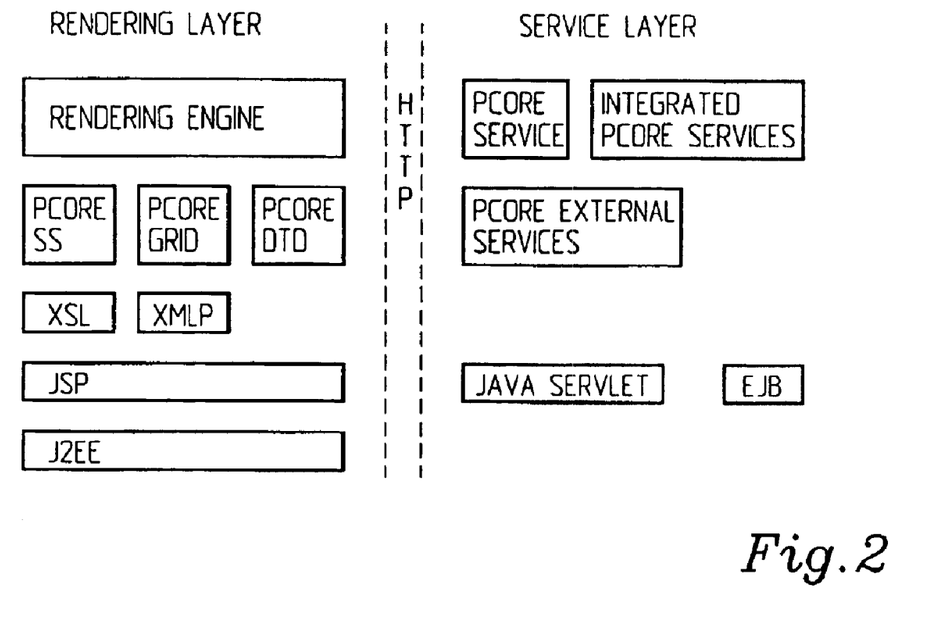
FIG. 2 illustrates a conceptual division of the presentation arrangement (layer) into a rendering functional layer and a service functional layer.
Figure 3A:
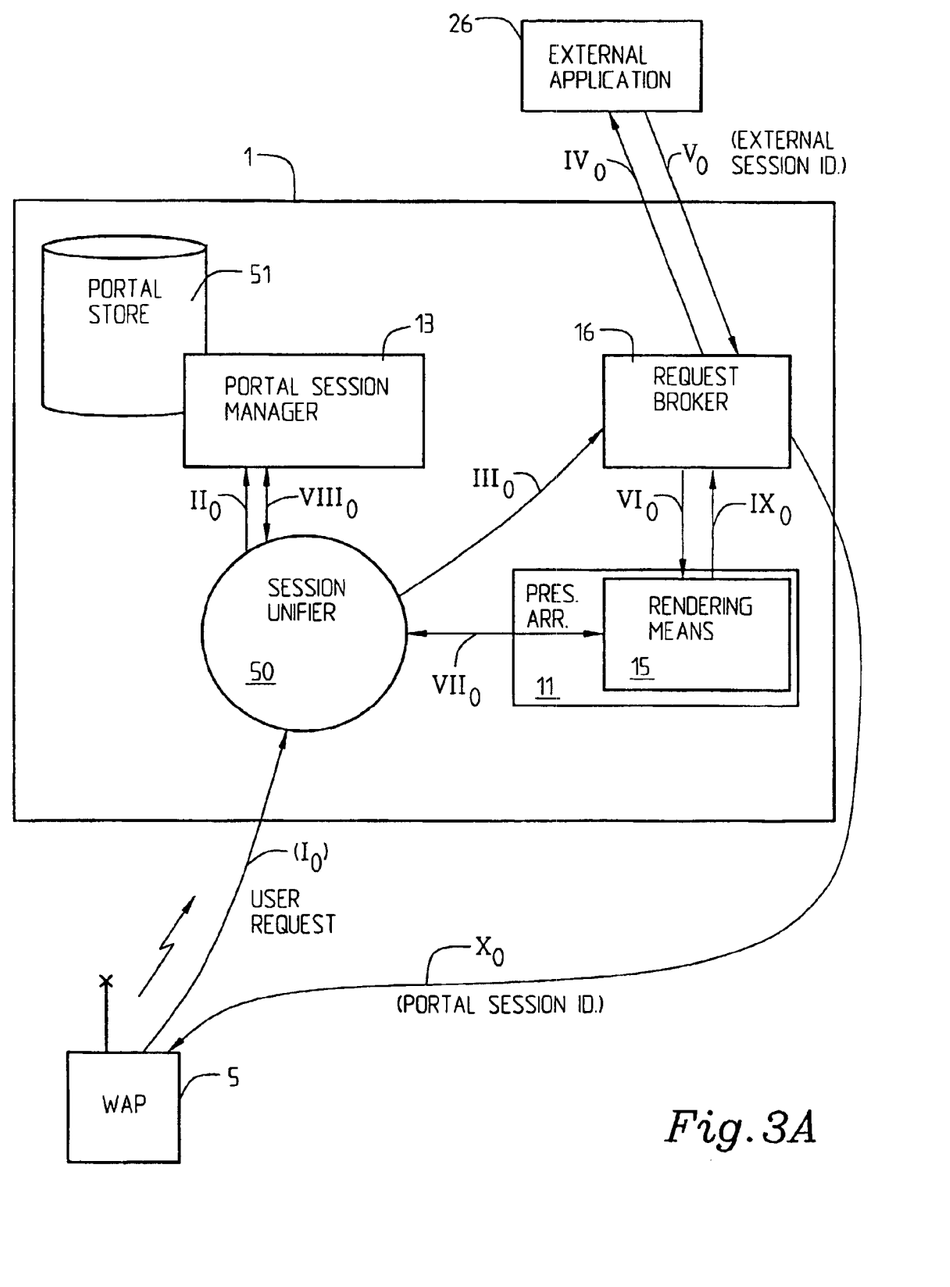
FIG. 3A is a block diagram of a portal through which an end user first requests access to an external application.
Figure 3B:
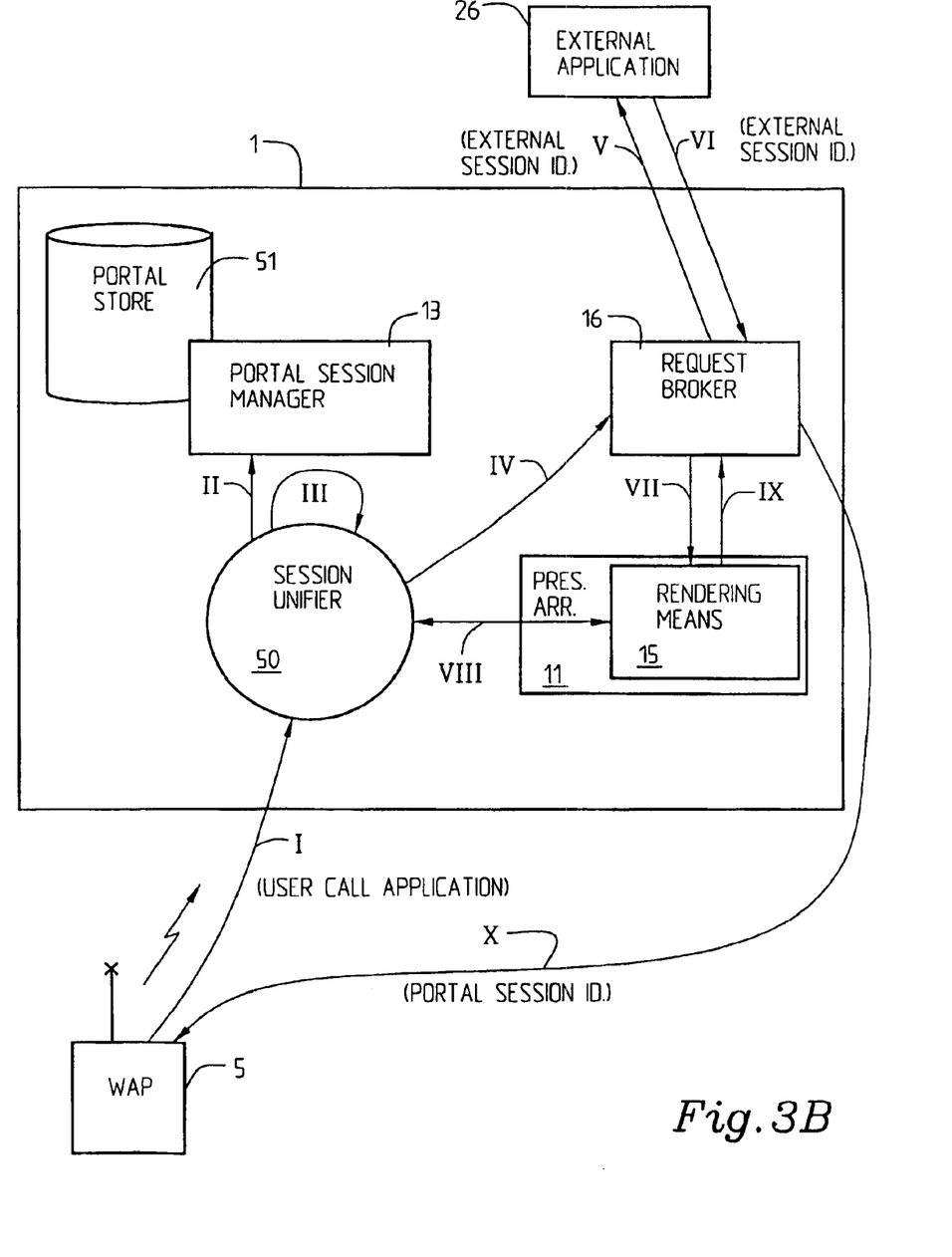
FIG. 3B is a block diagram as in FIG. 3A when the end user again accesses the application during the session.
Figure 4:
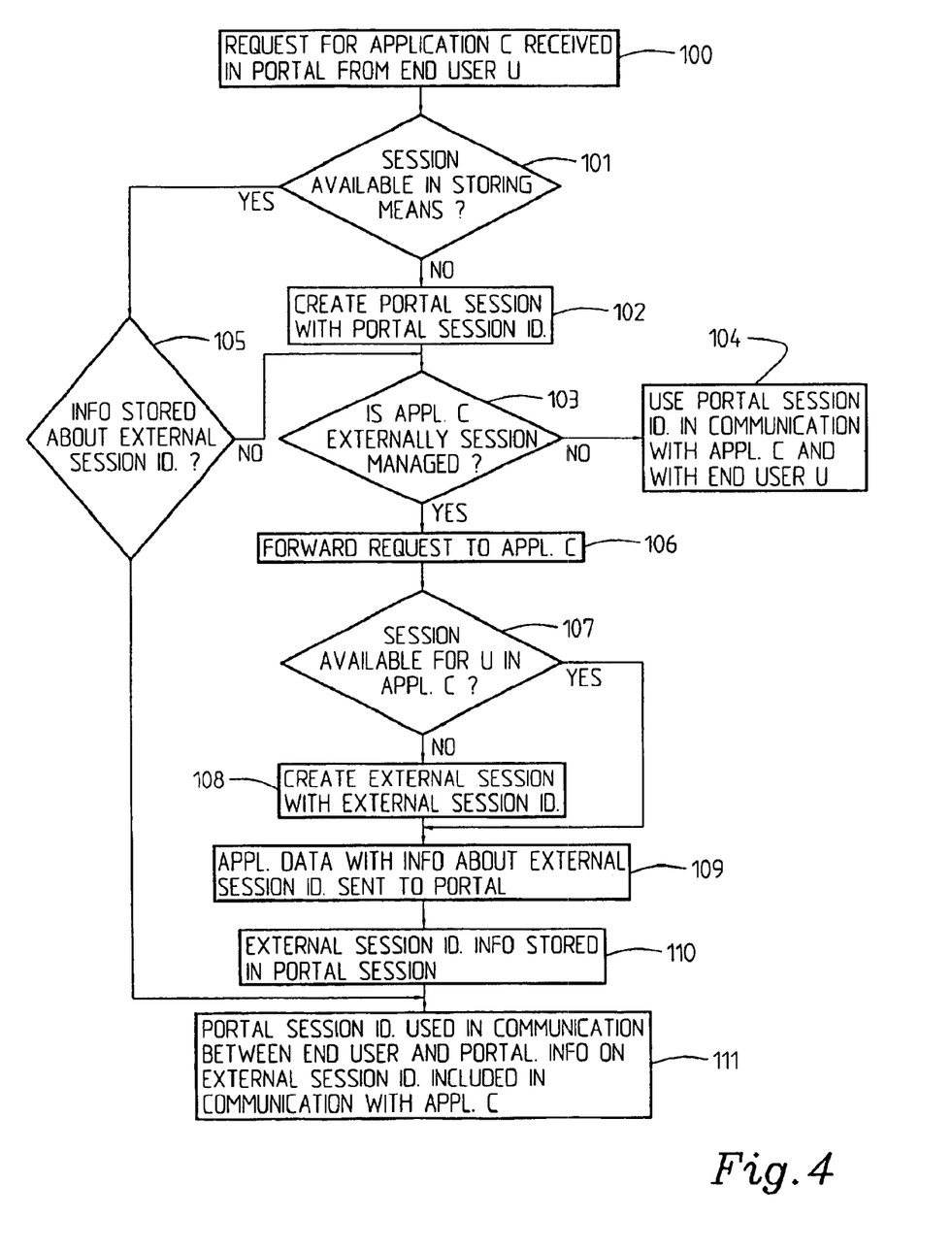
FIG. 4 is a flow diagram schematically describing a general implementation of the inventive concept.
Figure 5:
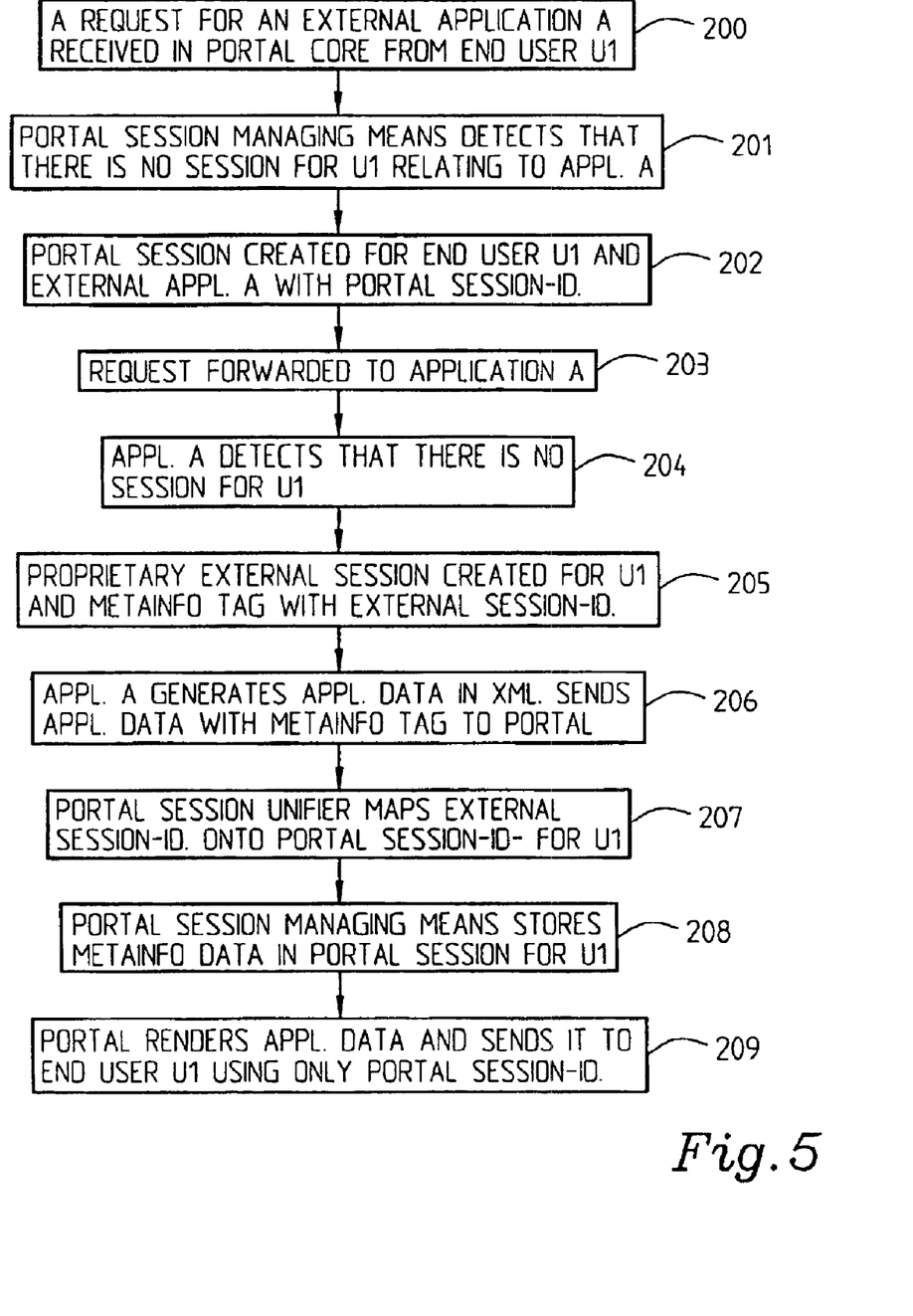
FIG. 5 is a flow diagram describing the flow when an end user accesses a portal requesting access to an external service/application when there is no session.
Figure 6:
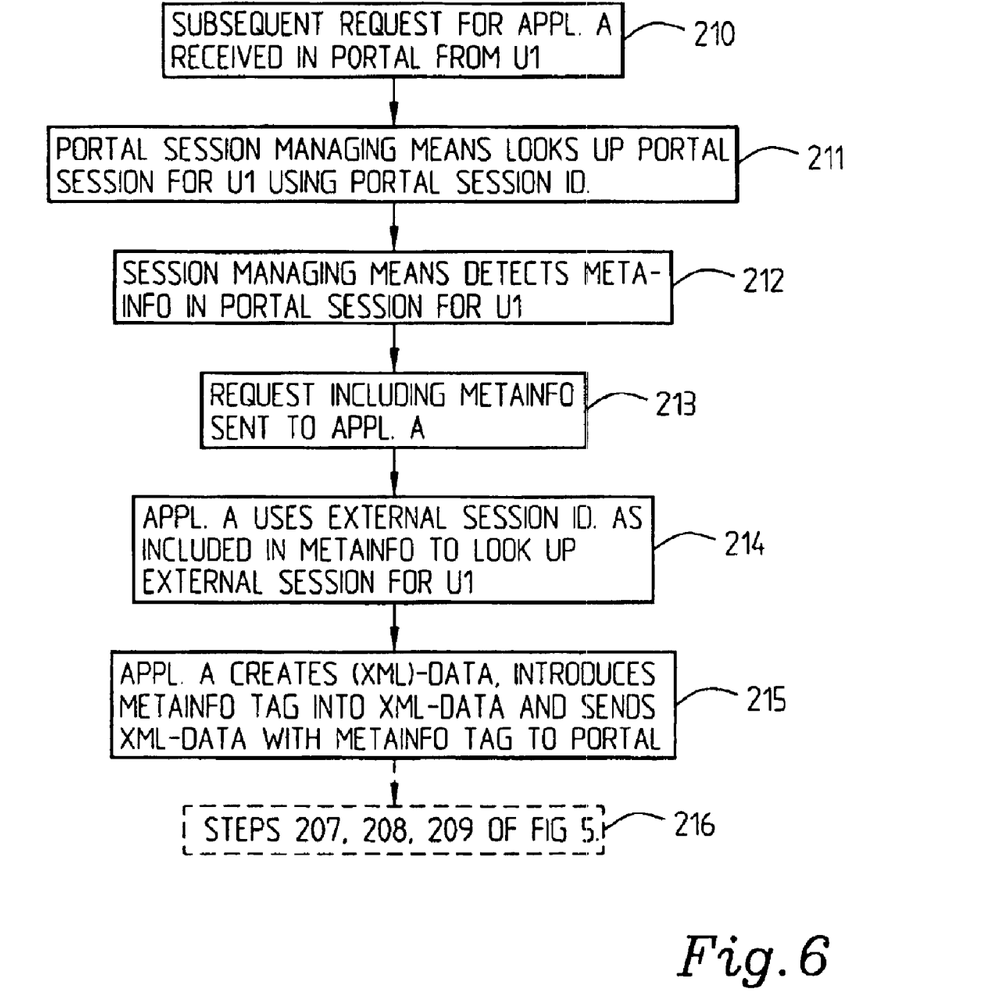
FIG. 6 is a flow diagram describing the procedure when an end user subsequently accesses the same application in the same session.
Figure 7:
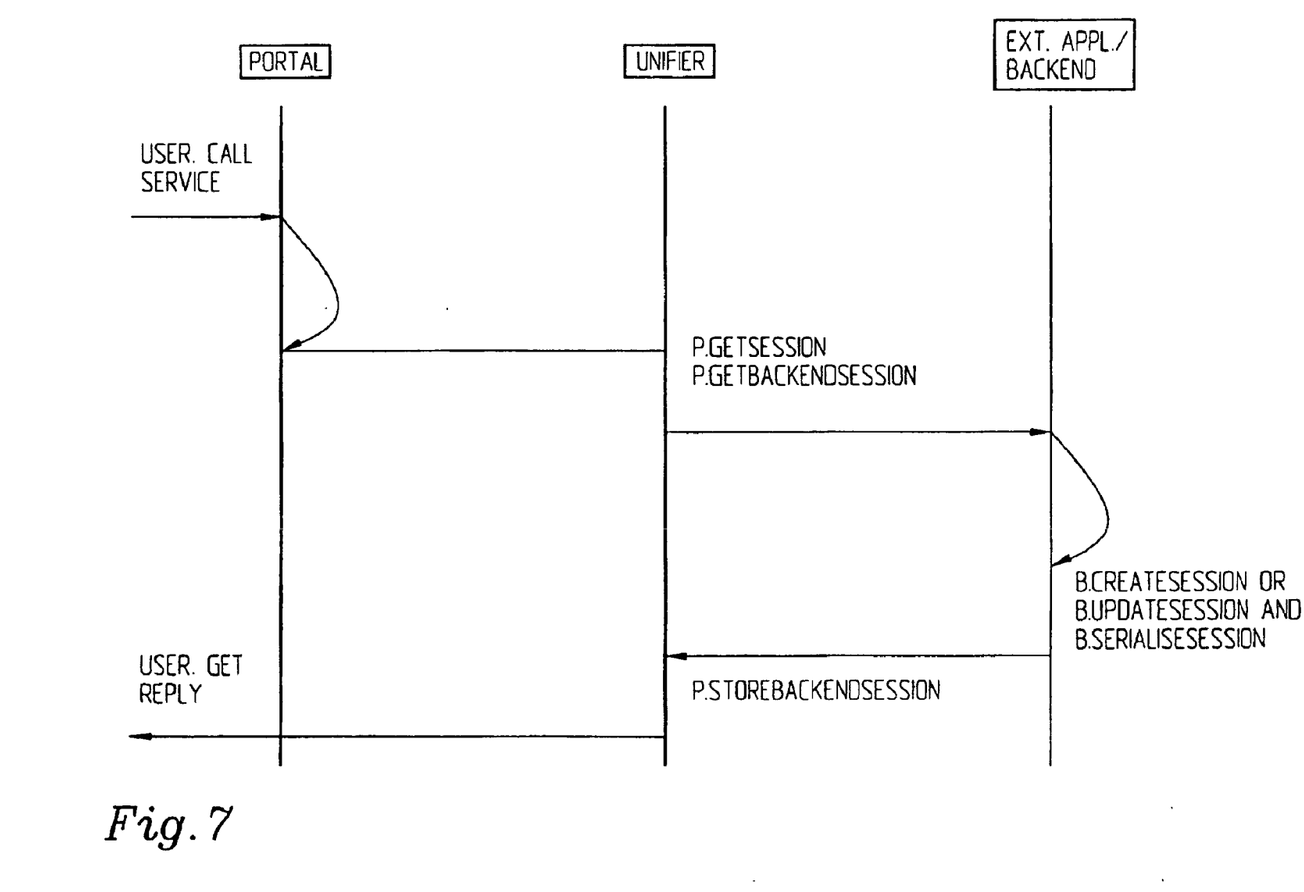
FIG. 7 is a diagram illustrating the session mapping interactions in the session unification procedure.

With reference to FIGS. 1 and 2 an exemplary portal structure will be described in a quite detailed manner. Such a portal structure may be used in the implementation of the inventive concept which is described with reference to FIGS. 3–7. It should also be clear that the invention by no means is limited to be implemented on a portal as described in FIGS. 1 and 2, this portion of the description mainly being included for describing some exemplifying underlying concepts and the functioning of one portal structure as such.

FIG. 1 thus shows one example on a portal structure 10 according to the invention. The portal structure 10 comprises a portal core 1 handling presentation functionalities, subscription and session management functionalities, a number of services and applications 2, comprising for example personal communication services, personal information services and Mobile E-Commerce services. In brief it is not important which kind of services that are provided and the inventive concept is applicable to any kind of service, content and application. When explaining the inventive concept in a more detailed manner (FIGS. 3–7), when an end user requests access to a service or an application, any service or application (or content) is meant and can be seen as conceptually included in the portal structure, although some of the services and applications actually are located outside the portal structure and are provided by any external service provider, which in this document however are denoted external in case they are externally-session managed, i. e. if they are not session managed by the portal session managing means.

The portal core structure 1 further includes a layer 3 including a number of service enabling means, also called service enablers 31–37, 38A–38D. The service enablers are among other things involved in authentication and basic services such as gateways and IP infrastructure. In this figure some examples on service enablers are given such as unified messaging 31, IP infrastructure 32, AAA-Server 33, notification support 34, charging support 35 and operation and maintenance support 36. Further examples of service enablers are mobile positioning system 37, WAP gateway 38A, SMS-C gateway 38B, multimedia proxy 38C, mobile E-pay 38D etc. It should be clear that some of these service enablers are more or less mandatory, whereas others are optional.

The portal structure is here also seen as including a connectivity or a (mobile) bearer layer comprising the mobile base stations and switching nodes, such as BTS (Base Transceiver Station), BSC (Base Station Controller), MSC (Mobile Switching Center) nodes etc. Which the nodes are, depends on which mobile network access is provided over, e. g. GSM. For GPRS or UMTS corresponding nodes are included in this layer; for example GGSN (Gateway GPRS Support Node). Whichever is the network, the network is the data bearer for the portal for access of mobile devices such as WAP-devices (Wireless Application Protocol). In FIG. 1 it is supposed that the accessing end user station comprises a WAP-telephone 5.

One example on such a portal structure is the Ericsson WISE™ Portal.

Internal applications or services can be seen as applications leveraging the service enablers and connectivity layers to add application specific values to mobile Internet applications of various categories, for example mobile services, personal communications as unified messaging or mail services, and personal information services. The information may be retrieved by the user through searches, but the information may also be provided to the end user by means of the push technology. This is open to end user customization.

It is advantageously supposed that the portal supports access by mobile end user stations, such as WAP-telephones 5 over a mobile network. Therefore nodes or components of the relevant mobile network have to be provided in mobile network connectivity and data bearer layer. In FIG. 1 a component denoted ISP network, Internet Service Provider network, is disclosed. This is an optional component which may be included or not.

In the layer comprising the service enablers 3 some types of service enablers are mandatory whereas other are not. Some of the service enablers are as seen as important components for providing mobile Internet functionalities. Some of the service enablers are seen as one part of the interface components between Internet and the mobile network. One component is here denoted IP infrastructure 32. An optional service enabler comprises the notification support 34, which generally is an optional component enabling applications to send out filtered notifications to end users using the SMS (Short Message Service) channel, but it may also be adapted to include other channels supporting WAP technology and 3G (3GPP) technology. Charging support enabler 35 may be provided to allow for flexibly choosing charging events. Another service enabler 36 relates to operation and maintenance support and generally it is a mandatory component. A service enabler WAP gateway 38A is an optional service enabler WAP gateway/proxy forming the access point between the wireless world and the Internet world. It supports mobile clients accessing the WAP gateway/proxy using GSM circuit switched data or WAP over SMS (SMS over MAP (Mobile Application Protocol)). The client uses a WAP enabled browser in the mobile device to connect to the WEB-server where the desired WAP application resides. Another service enabler, mobile positioning system, 37 is an optional component allowing sending the position of a user to the application requesting it. Another service enabler is a multimedia proxy 38C responsible for transmitting multimedia data over GPRS or UMTS. This however is an optional service enabling means. Also SMS-C (centre) gateway 38B is an optional component responsible for sending or receiving, storing and forwarding short messages between mobile stations and servers. Proprietary protocols are used for communication with applications. Mobile E-pay 38D is a component offering the basic functionality for Mobile E-Commerce and it is an optional component. AAA-Server 33 is a service enabling component relating to authentication, authorization and accounting. These functionalities may be provided in other manners but they may also be integrated in a functionality server, for example enabling traffic based charging and period charging. Such a component, either if it is split up into different components or comprises a single component, which is common for a number of functionalities, is mandatory, and in an advantageous implementation it is used for session management functionalities.

However, it should be clear that FIG. 1 merely shows examples on service enabling means that may be provided in a service enabling layer 3. At least some of the illustrated service enablers may be excluded, still others may be included etc.

The portal core, or the portal core layer, handles, as referred to above, presentation, subscription and session management and service tiers comprising a number of internal (and external) application servers. The core 1 comprises a presentation arrangement 11 which enables mobile portal presentation on multiple devices using multiple protocols. It may e. g. be XML driven (or more generally driven by a generic markup language). In one implementation it is a Java and XML driven multimarkup language capable presentation module.

The presentation arrangement 11 comprises a rendering means (a rendering engine) which in one implementation uses XML/XSLT technologies to ensure that information presented by services within the portal is displayed in a standardized way, regardless of which type of end user station (or browser) an end user uses when accessing the portal structure. Through the use of a generic markup language, for example XML/XSLT, the "look and feel" of content presented to end users may be customized. XSL is an abbreviation for Extensible Style Sheet Language. The Swedish patent application "An arrangement and a method for presentation customization in a portal structure", which is an application filed on the same date and by the same applicant as the present application, and the content of which herewith is incorporated herein by reference, relates to user customization in a portal structure as described herein, and particularly it is concerned with "look and feel" customization.

The functionalities within the portal core 1 and of the presentation arrangement 11 in particular will be further described with reference to FIG. 2.

The portal core 1 also includes the subscription manager. In one implementation subscription manager component information is stored in an LDAP (Lightweight Directory Access Protocol) directory and it is managed by a service called subscription manager. The subscription manager includes functions for the operator to create, maintain and delete subscriber information in the subscriber database. It also enables the end user of the system to subscribe to the services in the system. In a particular implementation a self-registration and self-service concept is supported in order to minimize costs by minimizing the workload on a customer care center. Information about available services may also be kept in the directory referred to above, and handled by the subscription manager. As a new service is entered into the directory, it will immediately be available for subscription by the end users. In the directory end users can be grouped so as to make new services available only to defined sets of end users. The subscription manager 12 can be interfaced with an existing customer care system through the application programming interface (API) it uses.

The session manager 13 is a general mechanism that can be used by applications and services. It comprises an interface to a subsystem for keeping track of all visitors to the portal and to provide the profile information of the visitors. When an end user enters the system/application, a session id entity is allocated and it is stored for that particular end user until logging out of the service or when the end user has been idle for a preset period of time. When a participating application starts, it first checks if there is an active session id for a particular user and if there is one, it would be able to resume from where the session was broken. The session management functionalities according to the inventive concept will be described below with reference to FIGS. 3A–7.

Finally, the portal core structure 1 here comprises two "internal" application servers 14A, 14B and one or more external application server 14C. The external application server 14C contains links to external application servers running existing services. In one implementation the service tier comprises three classes of services, of which a first is developed in compliance with the portal core specifications implemented using the portal core environment. A second service class relates to services which not necessarily are implemented in the portal core environment, such as for example an external e-mail system running on a non-portal core environment adapted to present itself through the portal core presentation. The third service class relates to external services which do not comply with the portal core service development or presentation architectures. This will be further explained with reference to FIG. 2.

In the following the portal core, and specifically the presentation arrangement, comprised in the presentation layer, will be more thoroughly described, first with a general reference to FIG. 2.

The service tier in one advantageous implementation comprises three service classes. The service class portal core service (pcoreservice) complies with the specifications of the portal core and it is used to leverage the portal core characteristics. In one implementation the services are implemented using the J2EE IBM WEBSphere Environment (an application server used to develop programmatic services involving logic, algorithms etc.). Such services generally have three or four tier architectures deploying JSP (Java Server Pages) on the front end, Java servlets and Enterprise Java Beans (EJB) in the middle layer and various entities on the back end. The second service class are the integrated portal core services (integrated pcore services) which leverage pcore presentation services but which are not necessarily implemented in the portal core J2EE environment, e. g. an external e-mail system running on a non-portal core environment, but adapted to present itself through the portal core presentation. The third service class, pcore external services, neither complies with the portal core service development nor with the presentation architectures but the services included in this class may e. g. be triggered to the portal core.

In one implementation there are two types of service options available within the service layer. One may consist of services provided by Broadvision (CORBA) for creating optimized rule based and personalized services connected to commerce and retail, and optimized for content delivery by a matching engine operating on content, profile and business rules. The other service type relates to programmatic services for example requiring algorithms, logic etc. which are not easily built in an optimized content delivery system. If these services are of pcore service class, then they may be industrialized for IBM WEBSphere J2EE environment and if they are of integrated services class and running in an external service server, they are adapted to the portal core presentation.

A service needs specifications including elements on the rendering functionality of the presentation layer as well as relating to the service layer functionality, i. e. schemes and logic. The portal core presentation architecture may, as referred to above, in one advantageous embodiment implement the J2EE architecture for the mechanisms of creating and employing services in specific elements or for defining services. However, the invention is not limited to a portal structure using J2EE and Broadvision which merely are given as examples.

The presentation layer is conceptually split-up into two tiers, one rendering layer residing in the portal core itself and a service layer available to any service that wants to present its content through the portal core presentation structure. The rendering layer in one advantageous implementation uses XML/XSLT technologies. Thereby it is also ensured that information presented by services within the portal can be displayed in a standardized way irrespectively of which is the end user station, i. e. irrespectively of which kind of end user station the end user uses when accessing the portal. Through the use of XML/XSLT it can be assured that a unified "look and feel" of content is presented within the presentation space.

If XML is used as a generic markup language, a service produces an output in the form of an XML document formatted using structure information from a pcore DTD. The XML output from the service is then used to feed the presentation engine of the presentation arrangement. The presentation engine uses pcore SS and pcore grid information associated with the pcore DTD of the XML document supplied by the service to generate the desired interface. Services which do not produce XML from a pcore DTD are particularly also able to present themselves through the presentation services.

As referred to earlier, the portal structure is advantageously able to handle different devices such as WAP-phones and broadband devices such as PCs, or the browser used thereby. A portal core structure platform and the logic in it are particularly totally separated from the presentation layer functionality, which makes it very easy to implement support for all different types of clients, even voice and speech synthesizers. By using for example XML/XSL, it is very easy to implement support for instance for a new type of WAP-display size. It is also possible to adapt the rendering process to various WEB-devices, existing and future hand-held devices, voice browsing and interactive TV.

In one particular implementation the WEB-interface is composed of square elements also denoted bricks. A brick is a container of a service, a picture or an application, displayed on the screen of the end user station. Using such bricks or containers, it is possible to customize the portal. A brick is thus an application created to be used inside the portal structure, which has a link to the application. The application has to provide display information to the portal when it wishes to render the brick. Advantageously a brick can appear in more than one format. The disposition of the bricks or containers represent a so called brick interface. In order to enable easy navigation, the WAP-interface may in one implementation be structured in the same way. In the WEB-interface the user is presented with a list of available bricks. Each brick contains an application, service or a background picture that can be included in the user's built WEB-site. A brick can also be a pre-configured service from an external company or provider. A Brick-grid is a non-visual representation of a customized portal. Depending on device, the brick grid is represented in a way that is most suitable for the device in use. The grid can be designed in many ways as well as the way the bricks are presented and organized, for example with tags. The brick grid is stored in a generic format and it is device/end user station independent.

Preferably the end user authenticates himself towards the portal with a one time login which will give the end user access to all the functionality within the portal. Any authentication towards connected or to external content or service providers is handled by the platform security system. Advantageously each application or service within the portal can be personalized to fit the needs of the end user and each application can be personalized for different devices. This is particularly advantageous when an end user wants to limit the amount of data sent to another end user station with limited capacity to present larger amounts of data, e. g. a WAP-phone. It is possible to select one application more than once and to give each of the different instances its own personalization.

Above one example on a portal structure has been described in which the inventive concept can be implemented. However, the invention as such is of course not limited to be implemented in such a portal but it is based on the assumption that a portal structure is provided which is able to provide end users, i. e. entities accessing the portal, with access to services/applications. For each end user a session is created by the portal and each session contains end user specific data. A service/application may be external or internal. In this context an internal application or service is defined as an application or service using the session management of the portal, whereas an external application or service is defined as an application or service using an external session management, which means that it may provide for the session management itself, or it may be session-managed by a third party.

What is claimed is:

1. A portal node within a computer-implemented communication network providing an end user station with access to services and applications wherein said, services and applications include internal services and applications and a plurality of external services and applications, comprising:

a presentation arrangement for communicating data with said end user station;

a portal session managing means for generating session related information, including portal session identification, the portal session managing means operating according to the servlet session API or the session EJB:s specifications defining basic session management operations;

a portal storing means for storing session related information;

an external session managing means for generating external session identification; and a session unifying means for mapping between said portal session identifications and said external session identifications wherein said external session identification is used for communicating between said portal node and said external services and applications and only said portal session identification is used for communicating between said portal node and said end user station.

2. A portal node according to claim 1, wherein the services and applications utilizing a generic markup language.

3. A portal node according to claim 2, wherein the generic markup language is XML.

4. A portal node according to claim 2, wherein the presentation arrangement comprises rendering means for translating service and application data in the generic markup language into a different markup language used by an end user station.

5. A portal node according to claim 2, wherein said data representing services and applications in the generic markup language are defined in a Document Type Definition (DTD) language with an URL-attribute.

6. A portal node according to claim 1, wherein said portal storing means stores all proprietary information associated with an external service and application and identified with a particular external session identification for a defined time period.

7. A portal structure according to claim 1, wherein said external session managing means comprises another portal.

8. A portal structure according to claim 1, wherein the portal session managing means stores information relating to end user initiated actions, including end user entering the portal, end user authentication, and end user access of a service/application into the portal storing means.

9. A portal node according to claim 1, wherein said portal session managing means assigning a portal session identification in response to receiving an end user request for service; and in response to determination that the requested service is internal to said portal node, using said assigned portal session identification; otherwise, said external session managing means assigning an external session identification for said external services and applications.

10. A portal node according to claim 9, wherein said session unifying means correlates said portal session identification with said external session identification allowing data provided by said external services and applications to be forwarded to said end user station.

11. A portal core within a computer-implemented communicating system for communicating data between an end user terminal and service providers wherein said service providers include internal service providers associated with said communication system and external service providers communicably coupled to said communicating system, comprising:

a presentation arrangement;

a portal session managing means generating portal session related information, including portal session identification, the portal session managing means operating according to the servlet session API or the session EJB:s specifications defining basic session management operations;

a portal storing means for storing portal session related information;

an external session managing means for generating external session identification for communicating with said external service providers;

a session unifying means for unifying management of portal sessions and external sessions by allowing said end user terminal to communicate with said internal service providers using said portal session identification and allowing said portal core to communicate with said external service providers using said external session identification.

12. A portal core of claim 11, wherein said portal storing means stores data mapping a particular portal session identification with a particular external session identification for a particular communication session between said end user terminal and a particular service provider.

13. An arrangement according to claim 11, wherein that the presentation arrangement comprises rendering means for translating service data in a generic markup language into other markup languages depending on the type of a requesting end user terminal for rendering service data output to end user terminals having requested access to a service into a markup language understandable by the end user station.

14. An arrangement according to claim 13, wherein the generic markup language is XML.

15. An arrangement according to claim 11, wherein that external session identification is provided in a meta-information tag introduced into the external service data and in that the meta-information data is stored in the corresponding portal session in the portal storing means storing portal session-information, and in that the portal session identification is added to the external application data as a parameter in communication with the end user terminal, replacing the external session identification.

16. An arrangement according to claim 15, wherein that for a subsequent request to the portal for the same external service by an end user terminal during a session, the metainformation is included into the request when forwarded from the portal core to the external service provider.

17. A computer-implemented method of session management in a portal structure including a portal core further including a presentation arrangement, portal session managing means handling session related information and portal storing means for storing session related information, comprising the steps of:
creating a portal session with a portal session identification when an end user requests access to a service/application, unless a portal session already exists, the portal session managing means operating according to the servlet session API or the session EJB:s specifications defining basic session management operations;
forwarding the request to the requested external service/application if the requested service/application is externally session managed;
creating in the external session managing means an external service/application proprietary session identification for the requesting end user unless a session already exists;
generating service/application data in the service/application;
introducing information about the external session identification into the service/application data;
returning service/application data including external session identification to the portal;
mapping the external session identification to the portal session identification;
storing the external session identification in the corresponding portal session means;
sending the service/application data to the requesting end user using only the portal session identification.

18. A method according to claim 17, wherein the method comprises the steps of:
in the portal:
looking up the portal session in the storing means at a subsequent request by an end user for an external service/application during the session;
establishing if the portal session related information contains an external session identification, if yes;
forwarding the request including the external session identification to the requested external service/application;
in the external session managing means or in the external service/application:
looking up the external service/application session;
generating service/application data;
adding the external session identification to the service/application data;
returning the service/application data with the external session identification to the portal session managing means;
in the portal:
replacing the external session identification by the corresponding portal session identification;
sending the service/application data to the end user station using the portal session identification only.

19. A method according to claim 17, wherein the external service/application utilizing a generic markup language, e. g. XML.

20. A method according to claim 19, wherein the step of adding external session identification comprises generation of and introduction of a metainformation tag containing at least external session identification to the service/application data.

* * * * *